United States Patent
Wolfson et al.

(10) Patent No.: US 10,929,389 B2
(45) Date of Patent: Feb. 23, 2021

(54) DATA PROVENANCE USING DISTRIBUTED LEDGERS

(71) Applicant: EMC IP Holding Company LLC, Hopkinton, MA (US)

(72) Inventors: Kfir Wolfson, Beer Sheva (IL); Jehuda Shemer, Kfar Saba (IL); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/170,229

(22) Filed: Oct. 25, 2018

(65) Prior Publication Data

US 2020/0134065 A1   Apr. 30, 2020

(51) Int. Cl.
*G06F 16/23* (2019.01)
*G06F 16/901* (2019.01)

(52) U.S. Cl.
CPC ...... *G06F 16/2379* (2019.01); *G06F 16/2365* (2019.01); *G06F 16/9024* (2019.01)

(58) Field of Classification Search
CPC ............ G06F 16/2358; G06F 11/0709; G06F 16/2343; G06F 16/2379; H04L 63/10; H04L 9/3239; H04W 4/60; G06Q 30/02; G06Q 20/34; G06Q 20/06
See application file for complete search history.

(56) References Cited

U.S. PATENT DOCUMENTS

| | | | |
|---|---|---|---|
| 9,704,143 B2* | 7/2017 | Walker | G06Q 20/06 |
| 2005/0102170 A1* | 5/2005 | Lefever | G06Q 30/02 |
| | | | 705/4 |
| 2007/0016647 A1* | 1/2007 | Gupta | G06Q 10/107 |
| | | | 709/206 |
| 2010/0186067 A1* | 7/2010 | Stephenson | G06F 21/10 |
| | | | 726/4 |
| 2015/0269215 A1* | 9/2015 | Lehouillier | G06F 16/2358 |
| | | | 707/626 |

(Continued)

OTHER PUBLICATIONS

U.S. Appl. No. 15/940,238 entitled, "Validation of Sensor Data Using a Blockchain", filed Mar. 29, 2018.

*Primary Examiner* — Etienne P Leroux
(74) *Attorney, Agent, or Firm* — Ryan, Mason & Lewis, LLP (57) ABSTRACT

Data provenance techniques are provided using distributed ledgers. An exemplary method comprises obtaining an indication of a data operation that operates on a data item, wherein the data operation comprises an operation type; creating an operation transaction in a first data ledger for the data operation, wherein the operation transaction comprises an identifier of the operation type, an identifier of an operator entity that performs the data operation; an identifier of the data item, and a timestamp of the data operation; and maintaining a provenance graph comprising a provenance graph transaction for a plurality of data operations in the first data ledger and/or a second data ledger, wherein a given provenance graph transaction comprises an identifier of source data items used to create the data item associated with the given provenance graph transaction and sources of the source data items, wherein the first data ledger and/or the second data ledger are used to determine an origin and/or recipients of one or more data items.

20 Claims, 7 Drawing Sheets

(56) References Cited

U.S. PATENT DOCUMENTS

| | | | |
|---|---|---|---|
| 2015/0341418 A1* | 11/2015 | Zhou | H04W 4/60 |
| | | | 715/740 |
| 2017/0091479 A1* | 3/2017 | Pluder | H04W 12/02 |
| 2017/0186007 A1* | 6/2017 | Lam | G06Q 20/34 |
| 2018/0253799 A1* | 9/2018 | Arthur | G06F 11/0709 |
| 2018/0322159 A1* | 11/2018 | Metreveli | G06F 16/2343 |
| 2018/0337770 A1* | 11/2018 | Bathen | H04L 9/3239 |
| 2019/0097807 A1* | 3/2019 | Mahanta | H04L 63/10 |
| 2020/0167773 A1* | 5/2020 | Cervenka | H04L 9/0643 |

* cited by examiner

DATA PROVENANCE USING DISTRIBUTED LEDGERS

FIELD

The field relates generally to the maintenance of provenance information for data.

BACKGROUND

Financial institutions process many transactions and massive amounts of data. There are significant opportunities for corruption, error, risk, and growth. Financial data is therefore highly regulated. The General Data Protection Regulation ("GDPR") in the European Union (EU), for example, regulates data protection and privacy for individuals within the EU. The GDPR also addresses the export of personal data outside of the EU. The GDPR aims to provide individuals with control of their personal data and to simplify the regulatory environment for international business. Generally, among other aspects, the GDPR specifies that a processor of personal data must disclose any data collection, declare the lawful basis and purpose for data processing, and state how long the data will be retained and if the data will be shared with third parties or outside of the EU.

Open banking is a financial services term as part of financial technology that refers to the use of open application programming interfaces (APIs) that allow third party developers to build applications and services around a given financial institution. In a number of countries or regions, however, a financial institution can be liable for any data leakage of information that originated with the financial institution, even if the financial institution itself was not the source of the data leak.

Data provenance is the process of tracing and recording the origin of data and the movement of data between entities. A need exists for improved data provenance techniques to monitor, for example, the creation, movement and/or deletion of data.

SUMMARY

In one embodiment, a method comprises obtaining an indication of a data operation that operates on a data item, wherein the data operation comprises an operation type; creating an operation transaction in a first data ledger for the data operation, wherein the operation transaction comprises an identifier of the operation type of the data operation, an identifier of an operator entity that performs the data operation; an identifier of the data item, and a timestamp of the data operation; and maintaining a provenance graph comprising a provenance graph transaction for each of a plurality of data operations in the first data ledger and/or a second data ledger, wherein a given provenance graph transaction comprises an identifier of one or more source data items used to create the data item associated with the given provenance graph transaction and one or more sources of the source data items, wherein the first data ledger and/or the second data ledger are used to determine an origin of one or more data items and/or to identify one or more recipients of the one or more data items.

In some embodiments, upon a detected leakage of a leaked data item, the first data ledger and/or the second data ledger are processed to: (i) determine if one or more entities establish a deletion of the leaked data item, and/or (ii) identify one or more source data items used to create the leaked data item and identify one or more entities having the one or more source data items. In at least one embodiment, the operation transaction further comprises a retention time of the data item by a recipient entity and wherein the first data ledger is processed to determine if the data item is deleted within the retention time of the data item by the recipient entity. The first data ledger and/or the second data ledger are optionally used to determine whether the one or more recipients of the one or more data items deleted copies of the one or more data items. The provenance graph is optionally processed to identify one or more of an entity that altered the one or more data items and an entity that made a misrepresentation about the one or more data items.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for maintaining data provenance information using distributed ledgers.

As noted above, data provenance is the process of tracing and recording the origins of data and its movement between entities. Generally, data provenance metadata describes the history of a data object. Data provenance provides a historical record of data and its origins, and is a part of data lineage. Data lineage includes the origin of data, what happens to the data and where the data moves over time. Data lineage provides visibility while greatly simplifying the ability to trace errors back to the root cause in a data analytics process.

In one or more embodiments, data provenance techniques are provided that use one or more distributed ledgers (e.g., a blockchain) to monitor the creation, movement and/or deletion of data. Among other benefits, the disclosed data provenance techniques allow banks and other financial institutions to cooperate and prove that they follow the appropriate regulations for distributing and deleting information and to establish, for example, show that a given financial institution is not the source of a particular data leak.

As previously indicated, in some countries or regions, a financial institution can be liable for any data leakage of information that originated with the financial institution, even if the financial institution itself was not the source of the data leakage. In Israel, for example, a financial institution is, by default, liable for a leakage of information that originated with the financial institution. This poses a significant risk for the financial institutions as they become liable for the data security and infrastructure of other financial services. The financial services that obtain access to particular banking information may be trusted services, but the data leakage can be due to a software bug, a user error or a malicious act by a hacker or rogue employee, for example. The ability to find the source of a particular data leakage will remove the liability from the source financial institution and also allow an easier root cause analysis of the leakage.

It is often currently difficult to find the root of a data leakage. The same data may arrive from multiple sources, for example, that consume the data from one or more banks and transfer the data between each other. In addition, a retention policy may be specified for data, but there is currently no mechanism for verifying that parties that receive the data indeed follow the retention policy. Since there is currently no provenance of where data exists and when data was deleted, it is often unknown whether an entity that obtained a given data item and was supposed to delete the given data item indeed deleted the given data item (if the given data item was not deleted by an entity, the entity is a potential source of a data leakage).

The data provenance monitoring is particularly challenging when a data item is comprised of data from multiple sources. For example, a total account balance of a given customer may arrive as a sum of account balances of multiple bank accounts. Thus, a financial service reporting the total account balance will need to retrieve the current balances from multiple financial institutions to calculate the total account balance. A leakage of the total account balance could not have come from any of the individual banks, but the source of the data depends on data from the individual banks.

In one or more embodiments, it is assumed that the parties participating in the disclosed data provenance protocol are trusted and willing (e.g., the parties want to conform to the disclosed protocol and do not try to bypass it). Thus, such embodiments of the disclosed data provenance techniques may not solve the case of unwilling parties.

In addition, some embodiments assume that parties can prove that they deleted particular data items. If an entity participating in the disclosed data provenance protocol wrote in the ledger that certain data was deleted, then it is assumed that the entity can prove that the data was deleted. This can be achieved, for example, with provenance-supporting databases and file systems. As all participants are willing parties in some embodiments, it is assumed that the software used and developed by the parties will actively keep the provenance up to date. For example, when deleting an object, the data provenance software will ensure that there are no copies of the deleted data saved elsewhere or in memory. As mentioned, it is in everyone's best interest to adhere to such rules, as they do not want to subsequently be held accountable.

Figure 1:
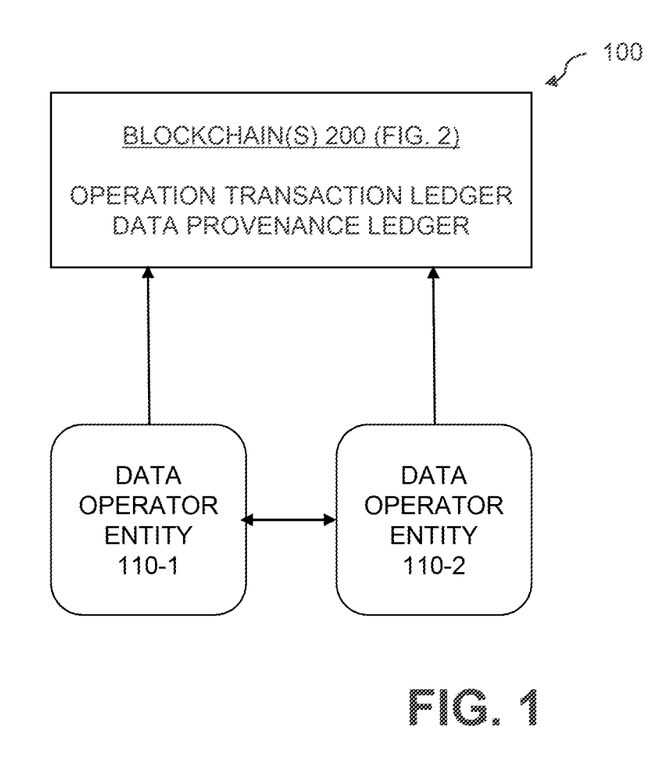
FIG. 1 illustrates an exemplary data provenance tracking system, according to one embodiment of the disclosure.

FIG. 1 illustrates an exemplary data provenance tracking system 100, according to one embodiment of the disclosure. As shown in FIG. 1, a plurality of data operator entities, such as data operator entities 110-1 and 110-2, perform data operations on data, such as create, save, send, receive and delete data.

Figure 2:
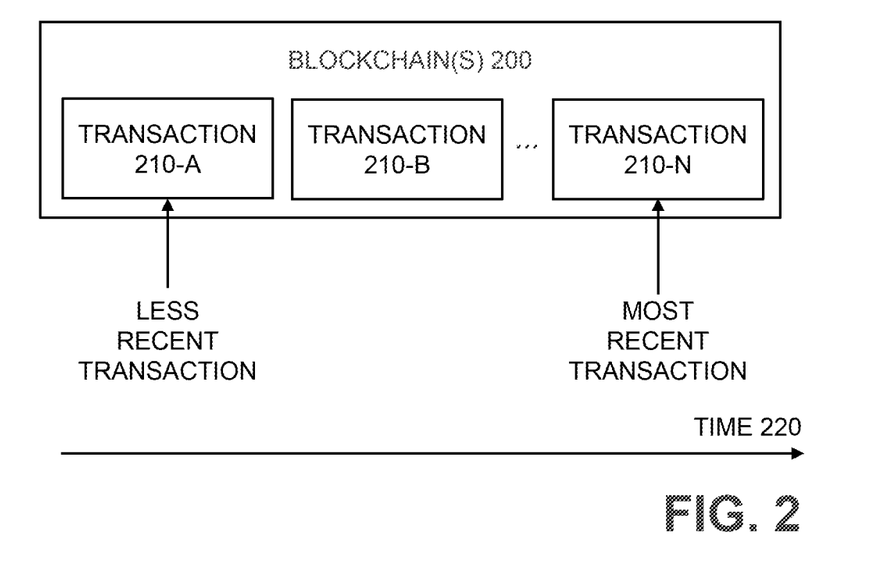
FIG. 2 illustrates the exemplary blockchain of FIG. 1 in further detail, according to some embodiments.

In one or more embodiments, one or more data ledgers, such as one or more blockchains 200, as discussed further below in conjunction with FIG. 2, are used to store metadata of data operations, such as data transfers, and data sources. For example, when data operator entity 110-1 transfers data to data operator entity 110-2 (e.g., one financial service firm to another financial service firm), a metadata command is entered into the one or more blockchain(s) 200. In at least one embodiment, the exemplary one or more blockchain(s) 200 comprises an operation transaction ledger for recording metadata about data operations, as discussed further below in conjunction with FIG. 4, and a data provenance ledger recording metadata about data sources (e.g., a provenance graph), as discussed further below in conjunction with FIGS. 5A and 5B.

As discussed further below in conjunction with FIGS. 3-5, the following exemplary data provenance protocol is defined between data operator entities 110: each data item has an identifier (a data item can be, for example, a current balance or a list of stocks held by a customer); and a transaction is created in one or more blockchain(s) 200 for each of the following data operations: save (e.g., storing the data in an internal database (saving of the data item includes a creation of the data item)); transfer (e.g., transfer data between two data operator entities 110 of the protocol (e.g., transfer of the data item includes a sending of the data item and/or a receiving of the data item)); and delete (e.g., deleting a data item that was previously saved).

It is noted that the data operator entities 110 can directly access the one or more blockchain(s) 200, as shown in FIG. 1, or access the one or more blockchain(s) 200 by means of one or more intermediary devices or nodes (not shown in FIG. 1), as would be apparent to a person of ordinary skill in the art.

The exemplary data provenance tracking system 100 of FIG. 1 optionally further comprises a datacenter (not shown) comprising one or more processing unit(s) and a database or data lake. The datacenter performs one or more of processing, events and analytics functions, in a known manner.

FIG. 2 illustrates the exemplary blockchain 200 of FIG. 1 in further detail, according to some embodiments. Generally, a blockchain 200, also referred to as a distributed ledger, is a technology that runs across disparate compute resources and supplies a secure transaction service. Transactions 210 have unique identifiers and cannot be disputed. Anything saved in the blockchain 200 will remain there and can be verified at any later time.

As noted above, in at least one embodiment, the exemplary one or more blockchain(s) 200 comprise an operation transaction ledger for recording metadata about data operations, as discussed further below in conjunction with FIG. 4, and a data provenance ledger recording metadata about data sources (e.g., a provenance graph), as discussed further below in conjunction with FIGS. 5A and 5B.

As shown in FIG. 2, the exemplary blockchain 200 comprises a plurality of transactions 210-A through 210-N. As noted above, transactions 210 are typically recorded in the blockchain 200 in such a way that the registered transactions 210 cannot be altered. In addition, transactions 210 are typically signed by the private key of a user and include a signature, which is used in one or more embodiments to ensure that a given transaction 210 originated from a given data operator entity 110.

In the example of FIG. 2, transaction 210-N comprises a most recent transaction, based on a time axis 220, and transaction 210-A comprises a less recent transaction (not necessarily the earliest transaction).

Figure 3:
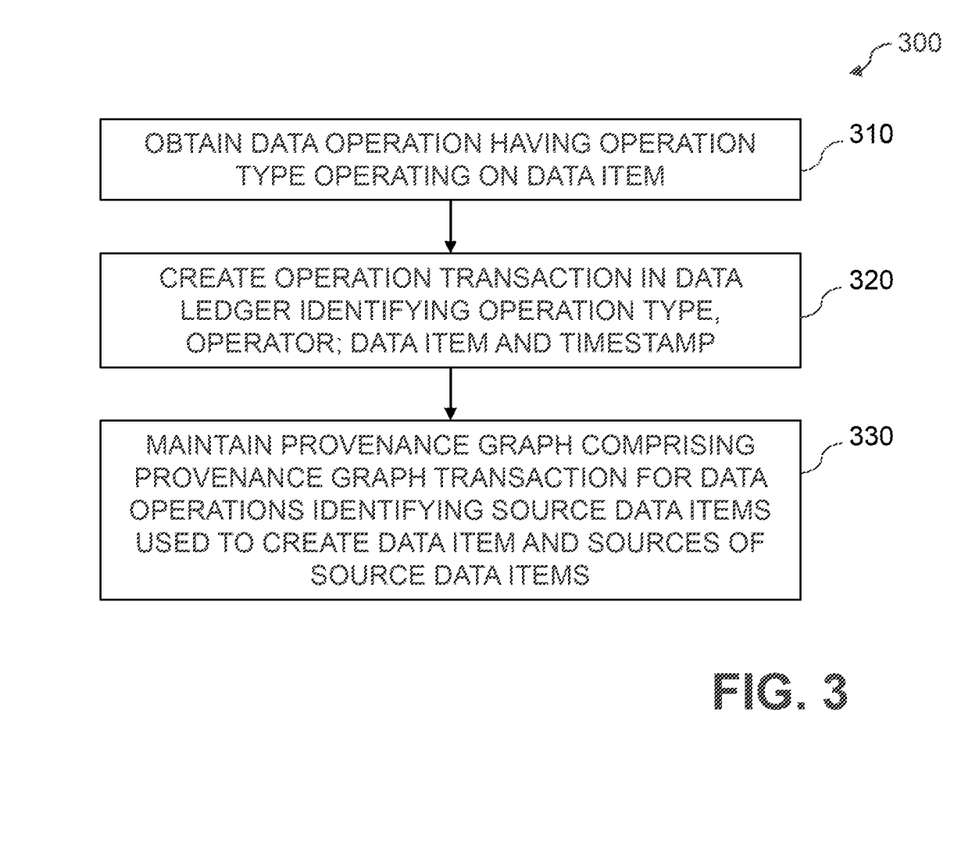
FIG. 3 is a flow chart illustrating a data provenance tracking process, according to an embodiment of the disclosure.

FIG. 3 is a flow chart illustrating a data provenance tracking process 300, according to an embodiment of the disclosure. As shown in FIG. 3, the exemplary data provenance tracking process 300 initially obtains an indication of a data operation that operates on a data item during step 310. The data operation comprises, for example, an operation type comprising a saving of the data item, a deletion of the data item and a transfer of the data item with a second entity.

During step 320, the exemplary data provenance tracking process 300 creates an operation transaction in a first data ledger 200. An exemplary operation transaction comprises, for example, an identifier of the operation type of the data operation, an identifier of an operator that performs the data operation; an identifier of the data item, and a timestamp of the data operation.

In addition, a provenance graph is maintained during step 330 comprising a provenance graph transaction for data operations in the first data ledger and/or a second data ledger. The exemplary given provenance graph transaction comprises an identifier of source data items used to create the data item associated with the given provenance graph transaction and sources of the source data items.

In some embodiments, the first data ledger and/or the second data ledger are used to determine an origin of data items and/or to identify recipients of the data items, as discussed further below.

Figure 4:
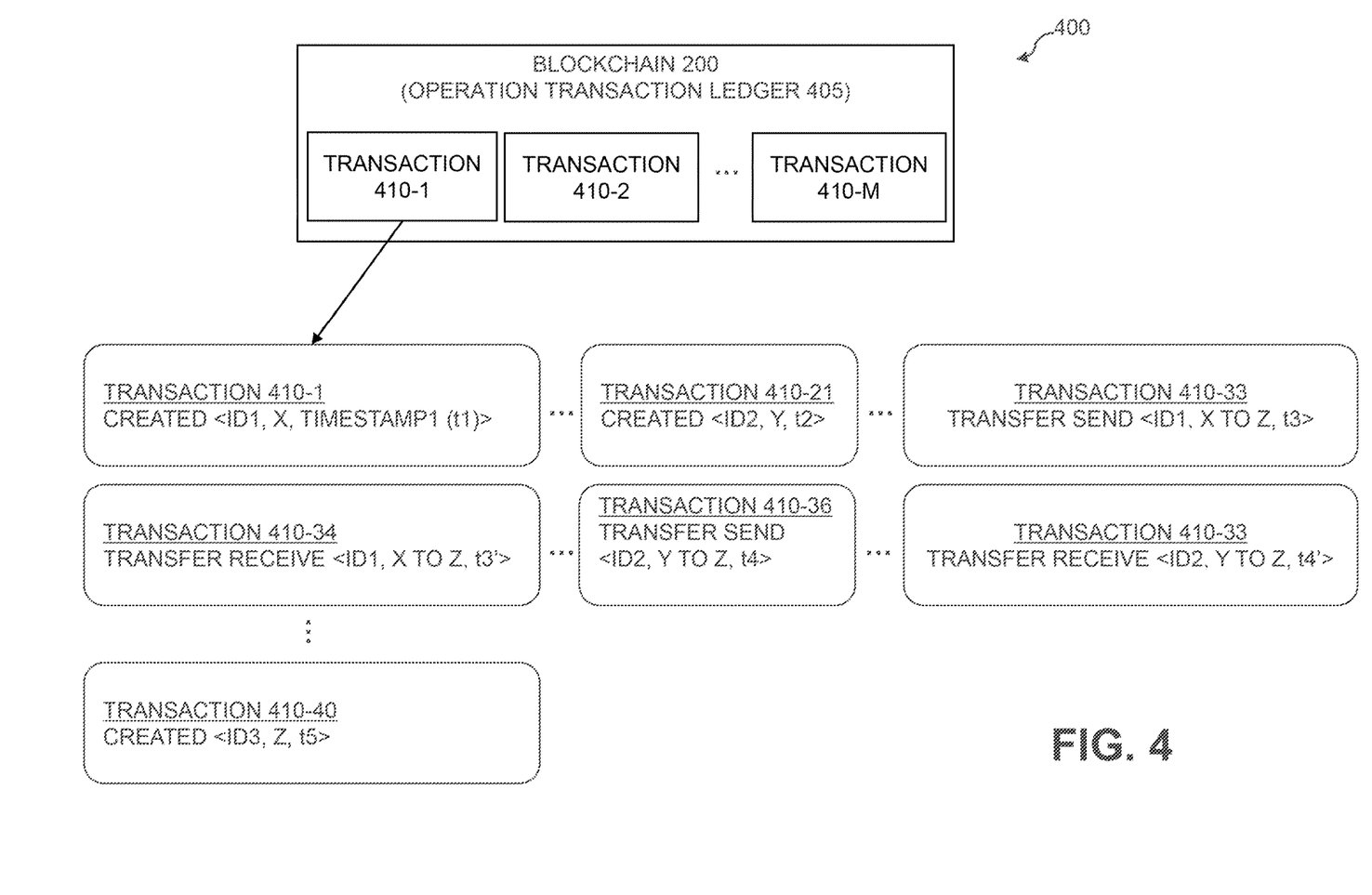
FIG. 4 illustrates a storage of operation transaction data in an operation transaction ledger of the blockchain of FIG. 2 using the exemplary data provenance tracking process of FIG. 3, according to some embodiments of the disclosure.

FIG. 4 illustrates a storage 400 of operation transaction data in an operation transaction ledger 405 of the blockchain 200 of FIG. 2 using the exemplary data provenance tracking process 300 of FIG. 3, according to some embodiments of the disclosure. As shown in FIG. 4, the exemplary blockchain 200 comprises a plurality of operation transactions 410-1 through 410-M.

In one or more embodiments, each transaction has the following exemplary format:

<operation, data_id, location_id, destination_id, timestamp_of_operation> where: operation is save, send, receive or delete; data_id is a unique identifier of the data; location id is an identifier of the source of the data (for example, "Citibank, branch xxx, database 7); destination_id is an identifier of the destination of a send or receive operation; and timestamp_of_operation is recorded, for example, in Greenwich Mean Time (GMT)

Consider a creation of a new data item, ID1 at a location z, that was created, for example, from data items ID1 from location x and ID2 from location y.

Thus, the following exemplary operation transactions 410 are placed in the operation transaction ledger 405 of the blockchain 200 for this example:

operation transaction 410-1: created <ID1, X, timestamp1 (t1)>;

operation transaction 410-21: created <ID2, Y, t2>;

operation transaction 410-33: transfer send <ID1, X to Z, t3>;

operation transaction 410-34: transfer receive <ID1, X to Z, t3'>;

operation transaction 410-36: transfer send <ID2, Y to Z, t4>;

operation transaction 410-38: transfer receive <ID2, Y to Z, t4'>; and operation transaction 410-40: created <ID3, Z, t5>.

In some embodiments, each operation transaction comprises the following exemplary entries: an identifier of the operation type of the data operation, an identifier of an operator that performs the data operation; an identifier of the data item, and a timestamp of the data operation. In further variations, each operation transaction optionally comprises a retention time of the data item by a recipient entity. In at least one implementation, a source of the data item and/or an identifier of a destination of the data item are included only when relevant for the particular operation type (e.g. "send"), and will not appear in the ledger, for example, for "delete" or "create" operations.

Figure 5A:
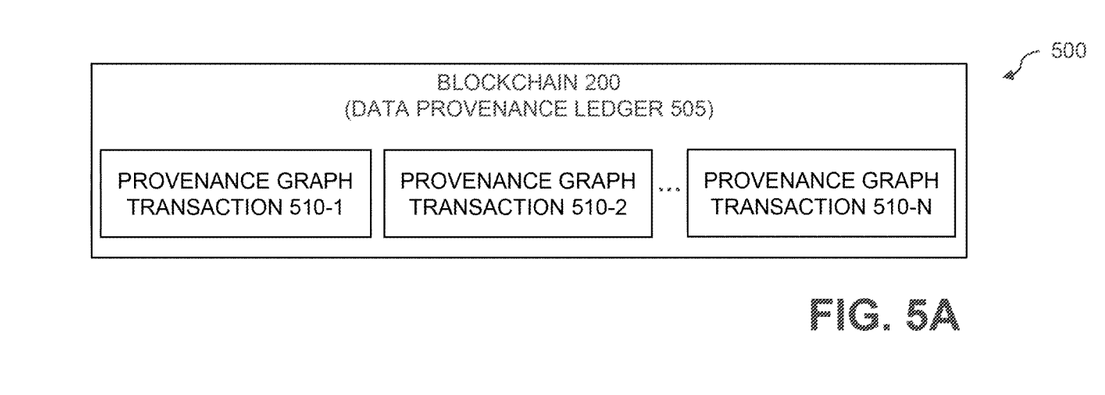
FIG. 5A illustrates a storage of provenance transaction data in a data provenance ledger of the blockchain of FIG. 2 using the exemplary data provenance tracking process of FIG. 3, according to at least one embodiment of the disclosure.

FIG. 5A illustrates a storage 500 of provenance transaction data in a data provenance ledger 505 of the blockchain 200 of FIG. 2 using the exemplary data provenance tracking process 300 of FIG. 3, according to some embodiments of the disclosure. As shown in FIG. 5A, the exemplary blockchain 200 comprises a plurality of provenance graph transactions 510-1 through 510-N.

As noted above, the exemplary data provenance tracking process 300 maintains a provenance graph comprising a provenance graph transaction 510 for data operations. The exemplary provenance graph transaction comprises an identifier of source data items used to create the respective data item and sources of the source data items.

In some embodiments, a given provenance graph transaction 510 comprises, for example, an identifier of one or more source data items used to create the data item associated with the given provenance graph transaction and one or more sources of the source data items. Each provenance graph transaction 510 optionally also comprises, for example, an identifier of the operator and/or operation that performed the data operation that transforms the source data items and/or additional information on the operation performed to transform the source data item(s) into the new item. For example, a "summation" or "aggregation", if the operation is taking a set of bank accounts and showing the bottom line sum of all funds in one figure/table.

Figure 5B:
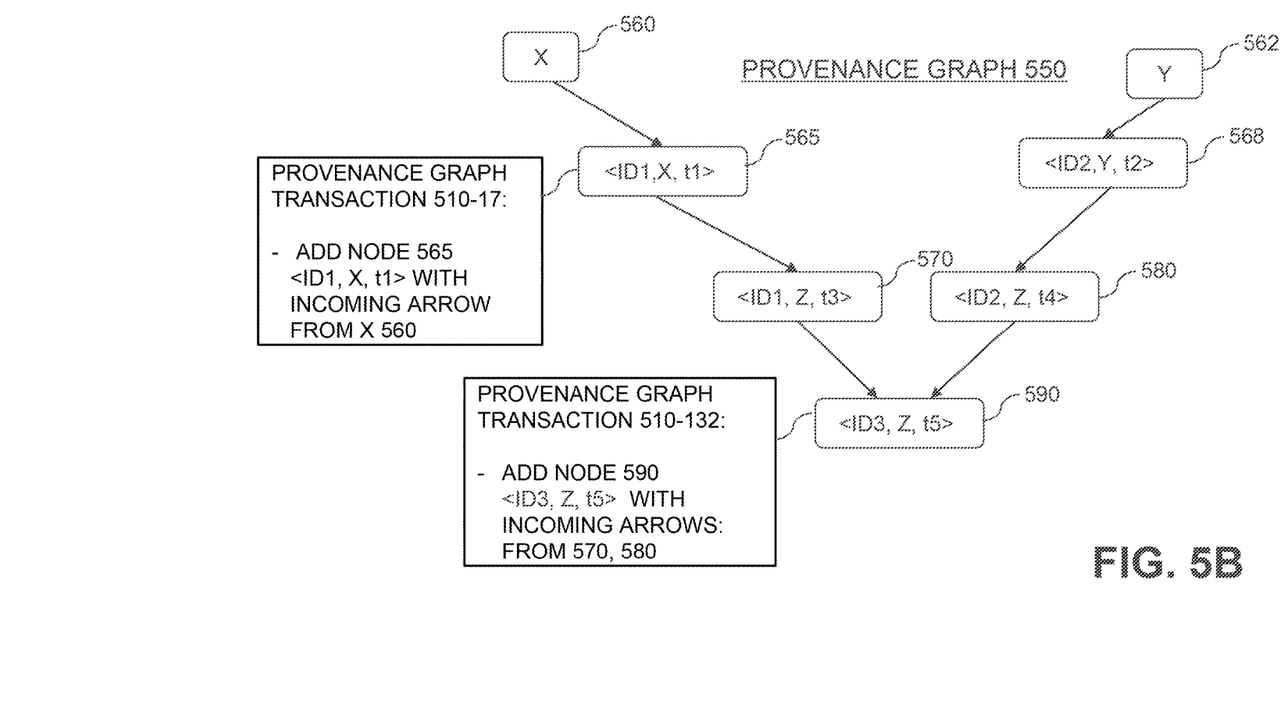
FIG. 5B illustrates a provenance graph generated from the provenance graph transactions of FIG. 5A, according to one embodiment.

FIG. 5B illustrates a provenance graph 550 generated from the provenance graph transactions 510 of FIG. 5A, according to at least one embodiment. FIG. 5B illustrates the provenance graph transactions 510 related to the above example regarding the creation of data item, ID1 at a location z, that was created, for example, from data items ID1 from location x and ID2 from location y. As shown in FIG. 5B, the provenance graph transaction 510-17 adds a node 565 to the provenance graph 550 for the creation of data item ID1 at node X 560 at a time t1, with an incoming arrow from node X 560 to node 565. In addition, exemplary provenance graph transaction 510-132 adds a node 590 to the provenance graph 550 for the creation of data item ID3 at node Z 590 at a time t5, with incoming arrows from nodes 570 and 580. Further, a node 568 is added to the provenance graph 550 for the creation of data item ID2 at node Y 562 at a time t2, with an incoming arrow from node Y 562 to node 568.

In this manner, whenever a new data item is created, an entry is created in the exemplary data provenance ledger 505 with the relevant data provenance information.

Exemplary Use Cases

In one or more embodiments, the exemplary operation transaction ledger 405 and/or the data provenance ledger 505 of the blockchain 200 of FIG. 2 can be used for testing compliance, for example, by attaching a notion of retention time to a particular data item. When data is transferred from Bank A to Financial Service B, the data contains a retention time for the data, such as one week. If the operation transaction ledger 405 does not include an indication that Financial Service B deleted the data within the allotted retention time, the operation transaction ledger 405 (or an external service) can indicate that the financial service is not compliant.

In further variations, the operation transaction ledger 405 can be used to track where a specific data element has spread. For example, with the GDPR requirement of "the right to be forgotten," it might be necessary to follow a given data item and make sure that the given data item was deleted from all places where the given data item was sent.

In some implementations, the exemplary operation transaction ledger 405 and/or the data provenance ledger 505 of the blockchain 200 of FIG. 2 can be used to find potential roots for a data leakage and eliminate other parties as sources for the leakage. If a leakage of data is detected, for example, the source of the data can be tracked by investigating the operation transaction ledger 405 and provenance graph 550. Any node in the provenance graph 550 may be related to the leakage, but if a member of the disclosed data provenance protocol has proof that they had deleted the relevant piece of information, then the member may not be the root of the leakage.

In addition, if a leaked data item is calculated and required multiple sources of data, only parties that had access to all of the relevant source information may be blamed for the leakage.

In a further variation, the exemplary operation transaction ledger 405 and/or the data provenance ledger 505 of the blockchain 200 of FIG. 2 can be used to identify one or more entities that altered a data item, and/or made a misrepresentation about a data item. For example, assume that an entity provides a total account balance in a different currency, using a proprietary conversion method. If the entity includes a conversion fee, or makes a misrepresentation about the actual balance, for example, based on an error in the computation, the provenance graph can be processed to show who altered the data.

In some embodiments, the disclosed techniques for maintaining data provenance information using distributed ledgers provide a mechanism for regulatory compliance and allow a lineage of data to be investigated (e.g., investigate an origin of one or more data items and/or identify one or more recipients of one or more data items).

Among other benefits, the disclosed techniques for maintaining data provenance information in distributed ledgers provide a record of operations performed on data and the source of the data. As noted above, the exemplary data provenance tracking system 100 of FIG. 1 provides a mechanism for recording data provenance information in an exemplary blockchain and enables an evaluation of the lineage of data.

One or more embodiments of the disclosure provide improved methods, apparatus and computer program products for maintaining data provenance information using distributed ledgers. The foregoing applications and associated embodiments should be considered as illustrative only, and numerous other embodiments can be configured using the techniques disclosed herein, in a wide variety of different applications.

It should also be understood that the disclosed data provenance techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for maintaining data provenance information using distributed ledgers may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based data provenance tracking system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based data provenance tracking platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
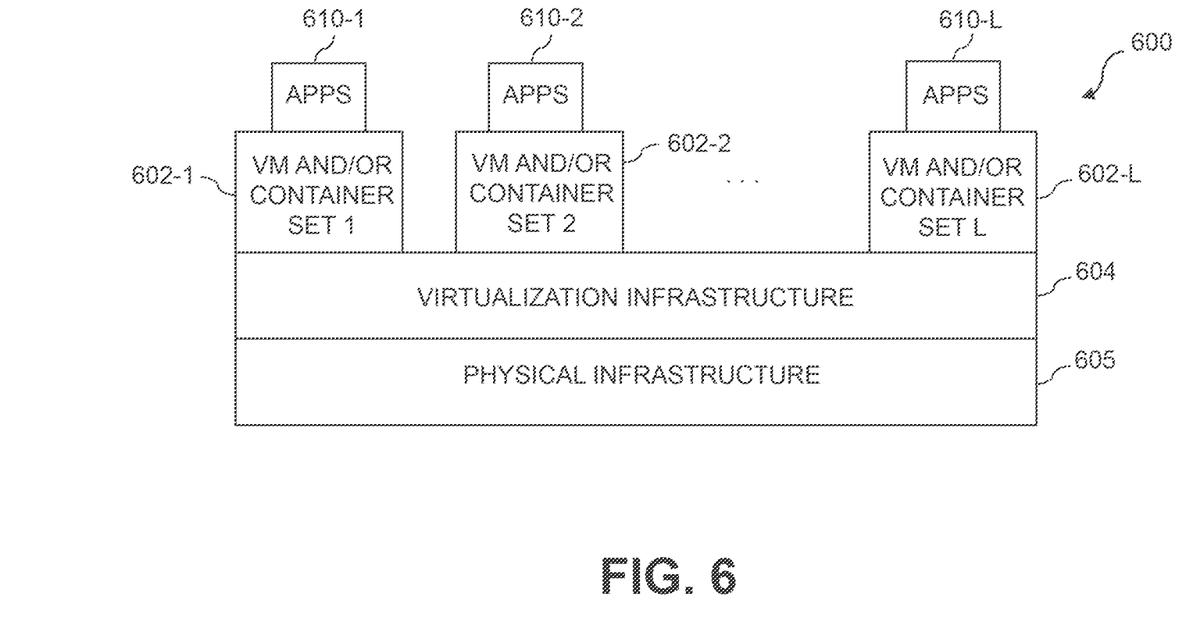
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the data provenance tracking system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide data provenance tracking functionality of the type described above for one or more processes running on a given one of the VMs. For example, each of the VMs can implement data provenance tracking control logic and associated ledgers 405, 505 for providing data provenance tracking functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide data provenance tracking functionality of the type described above for one or more processes running on different ones of the containers. For example, a container host device supporting multiple containers of one or more container sets can implement one or more instances of data provenance tracking logic and associated ledgers 405, 505 for use in data lineage analysis.

As is apparent from the above, one or more of the processing modules or other components of data provenance tracking system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
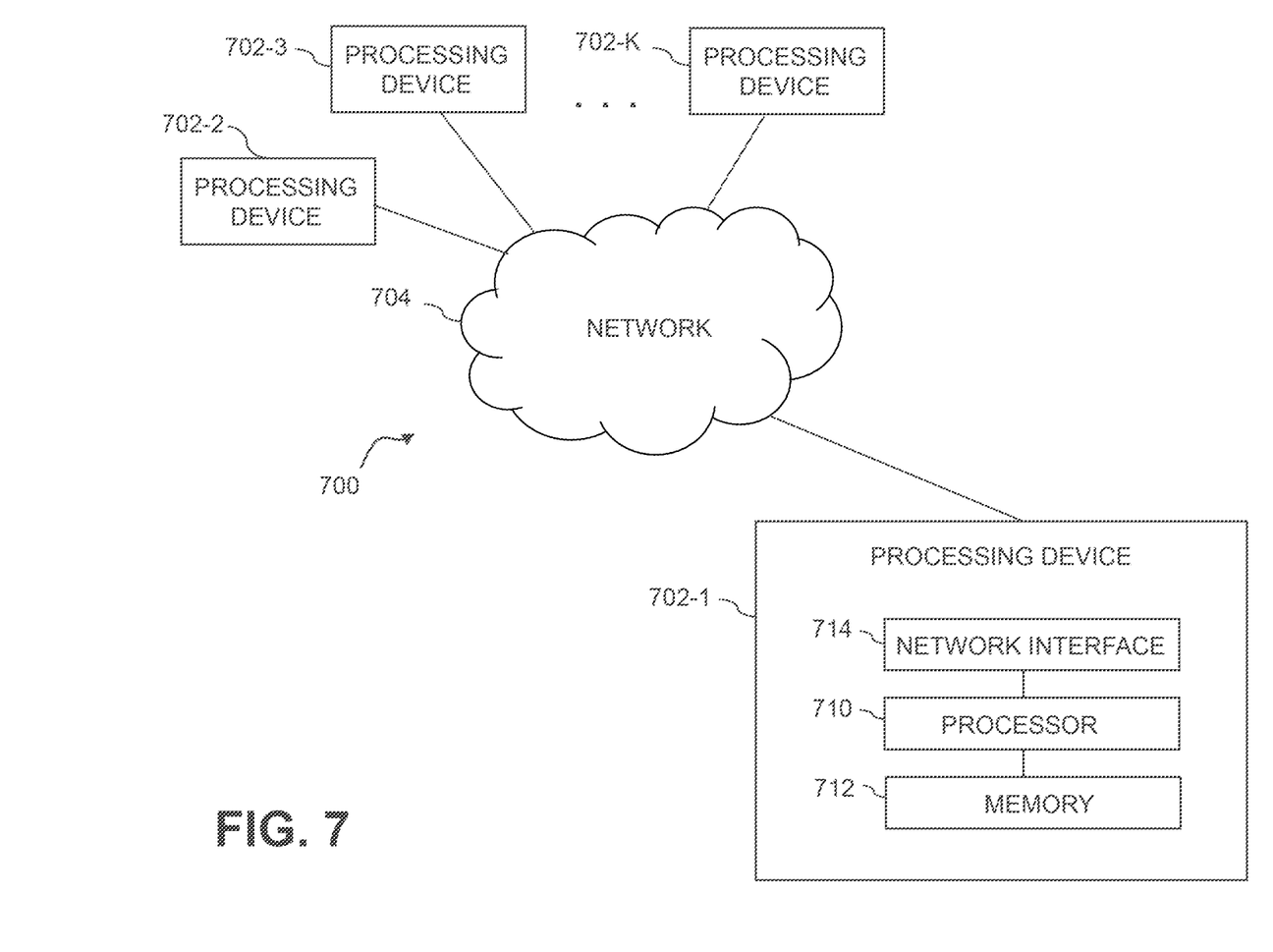
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining an indication of a data operation that operates on a data item, wherein the data operation comprises an operation type;
   creating, using at least one processing device, an operation transaction in a first data ledger for the data operation, wherein the operation transaction comprises an identifier of the operation type of the data operation, an identifier of an operator entity that performs the data operation; an identifier of the data item, and a timestamp of the data operation; and
   maintaining, using the at least one processing device, a provenance graph comprising a provenance graph transaction for each of a plurality of data operations in one or more of the first data ledger and a second data ledger, wherein a given provenance graph transaction comprises an identifier of one or more source data items used to create the data item associated with the given provenance graph transaction and one or more sources of the source data items,
   wherein one or more of the first data ledger and the second data ledger are used to one or more of determine an origin of one or more data items and to identify one or more recipients of the one or more data items.

2. The method of claim 1, wherein one or more of the first data ledger and the second data ledger comprise a blockchain.

3. The method of claim 1, wherein, upon a detected leakage of a leaked data item, one or more of the first data ledger and the second data ledger are processed to one or more of: (i) determine if one or more entities establish a deletion of the leaked data item, and (ii) identify one or more source data items used to create the leaked data item and identify one or more entities having the one or more source data items.

4. The method of claim 1, wherein the operation transaction further comprises a retention time of the data item by a recipient entity and wherein the first data ledger is processed to determine if the data item is deleted within the retention time of the data item by the recipient entity.

5. The method of claim 1, wherein one or more of the first data ledger and the second data ledger are used to determine whether the one or more recipients of the one or more data items deleted copies of the one or more data items.

6. The method of claim 1, wherein the operation transaction further comprises one or more of an identifier of a source of the data item, and an identifier of a destination of the data item for one or more predefined operation types.

7. The method of claim 1, wherein the given provenance graph transaction further comprises an identifier of one or more of the operator and the operation that performed the data operation that transforms the source data items.

8. The method of claim 1, wherein the provenance graph is processed to identify one or more of an entity that altered the one or more data items and an entity that made a misrepresentation about the one or more data items.

9. A system, comprising:
   a memory; and
   at least one processing device, coupled to the memory, operative to implement the following steps:
   obtaining an indication of a data operation that operates on a data item, wherein the data operation comprises an operation type;
   creating, using at least one processing device, an operation transaction in a first data ledger for the data operation, wherein the operation transaction comprises an identifier of the operation type of the data operation, an identifier of an operator entity that performs the data operation; an identifier of the data item, and a timestamp of the data operation; and
   maintaining a provenance graph comprising a provenance graph transaction for each of a plurality of data operations in one or more of the first data ledger and a second data ledger, wherein a given provenance graph transaction comprises an identifier of one or more source data items used to create the data item associated with the given provenance graph transaction and one or more sources of the source data items,
   wherein one or more of the first data ledger and the second data ledger are used to one or more of determine an origin of one or more data items and to identify one or more recipients of the one or more data items.

10. The system of claim 9, wherein, upon a detected leakage of a leaked data item, one or more of the first data ledger and the second data ledger are processed to one or more of: (i) determine if one or more entities establish a deletion of the leaked data item, and (ii) identify one or more source data items used to create the leaked data item and identify one or more entities having the one or more source data items.

11. The system of claim 9, wherein the operation transaction further comprises a retention time of the data item by a recipient entity and wherein the first data ledger is processed to determine if the data item is deleted within the retention time of the data item by the recipient entity.

12. The system of claim 9, wherein one or more of the first data ledger and the second data ledger are used to determine whether the one or more recipients of the one or more data items deleted copies of the one or more data items.

13. The system of claim 9, wherein the operation transaction further comprises one or more of an identifier of a source of the data item, and an identifier of a destination of the data item for one or more predefined operation types.

14. The system of claim 9, wherein the provenance graph is processed to identify one or more of an entity that altered the one or more data items and an entity that made a misrepresentation about the one or more data items.

15. A computer program product, comprising a tangible machine-readable storage medium having encoded therein executable code of one or more software programs, wherein the one or more software programs when executed by at least one processing device perform the following steps:
  obtaining an indication of a data operation that operates on a data item, wherein the data operation comprises an operation type;
  creating, using at least one processing device, an operation transaction in a first data ledger for the data operation, wherein the operation transaction comprises an identifier of the operation type of the data operation, an identifier of an operator entity that performs the data operation; an identifier of the data item, and a timestamp of the data operation; and
  maintaining a provenance graph comprising a provenance graph transaction for each of a plurality of data operations in one or more of the first data ledger and a second data ledger, wherein a given provenance graph transaction comprises an identifier of one or more source data items used to create the data item associated with the given provenance graph transaction and one or more sources of the source data items,
  wherein one or more of the first data ledger and the second data ledger are used to one or more of determine an origin of one or more data items and to identify one or more recipients of the one or more data items.

16. The computer program product of claim 15, wherein, upon a detected leakage of a leaked data item, one or more of the first data ledger and the second data ledger are processed to one or more of: (i) determine if one or more entities establish a deletion of the leaked data item, and (ii) identify one or more source data items used to create the leaked data item and identify one or more entities having the one or more source data items.

17. The computer program product of claim 15, wherein the operation transaction further comprises a retention time of the data item by a recipient entity and wherein the first data ledger is processed to determine if the data item is deleted within the retention time of the data item by the recipient entity.

18. The computer program product of claim 15, wherein one or more of the first data ledger and the second data ledger are used to determine whether the one or more recipients of the one or more data items deleted copies of the one or more data items.

19. The computer program product of claim 15, wherein the operation transaction further comprises one or more of an identifier of a source of the data item, and an identifier of a destination of the data item for one or more predefined operation types.

20. The computer program product of claim 15, wherein the provenance graph is processed to identify one or more of an entity that altered the one or more data items and an entity that made a misrepresentation about the one or more data items.

* * * * *